July 8, 1924.  L. H. BOYLE  1,500,360
HARNESS
Filed Dec. 26, 1923
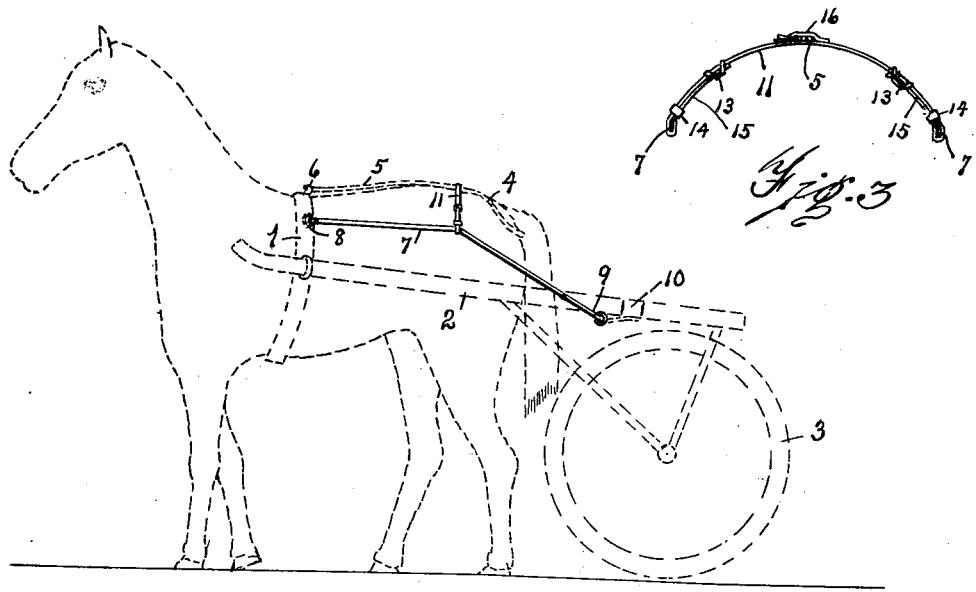
Fig. 3
Fig. 1
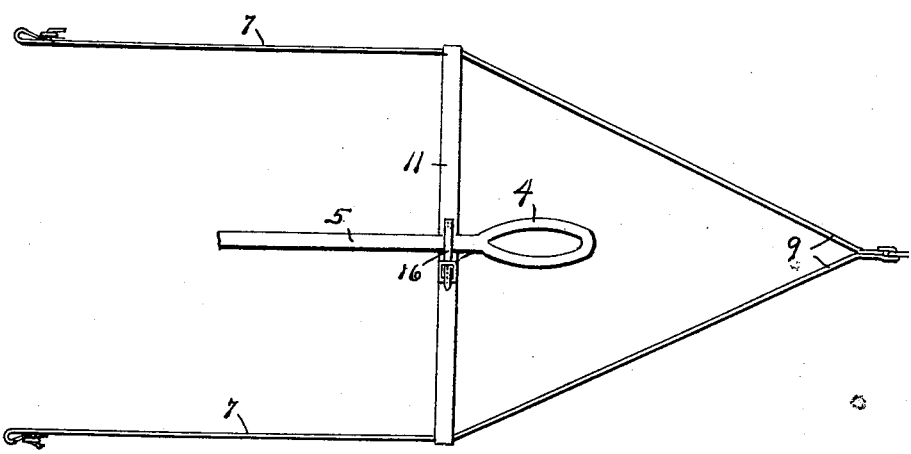
Fig. 2
INVENTOR.
Lewis Homer Boyle
BY Edward N. Pagelsen
ATTORNEY.

Patented July 8, 1924.

1,500,360

UNITED STATES PATENT OFFICE.

LEWIS HOMER BOYLE, OF BELOIT, OHIO.

HARNESS.

Application filed December 26, 1923. Serial No. 682,627.

*To all whom it may concern:*

Be it known that I, LEWIS HOMER BOYLE, a citizen of the United States, and residing at Beloit, in the county of Mahoning and State of Ohio, have invented a new and Improved Harness, of which the following is a specification.

This invention relates to harnesses especially adapted for speed horses when hitched to speed wagons such as sulkies, and its object is to provide a trace-construction which will prevent the horse from crowding the sulky sidewise, which will prevent the horse from kicking tires from the wheels of the sulkies, and which will compel the horse to always run centrally of the sulky and between the thills.

This invention consists of a pair of traces attached at their front ends to the harness saddle near the hook for the crouper-strap and united at their rear ends so as to attach as a unit to the sulky at a point midway between the wheels, in combination with supporting straps which attach to the crouper-strap at about the point of the hip and of such length that they attach to the traces approximately at the height of the hip joints of the horse.

In the accompanying drawing, Fig. 1 is a side elevation of this improved harness in position on a horse. Fig. 2 is a plan thereof. Fig. 3 is an elevation of the supporting strap for the traces.

Similar reference characters refer to like parts throughout the several views.

The saddle 1, thills 2, sulky wheels 3, crouper 4, crouper-strap 5 and crouper-strap-hook 6 shown in the drawing are of any well known or desirable construction. The traces 7 attach at their front ends to the saddle 1 in any desired manner, preferably by buckling to the rings 8. Their rear ends 9 are brought together and attach to the central point of any desired member of the sulky such as a cross bar 10 or to the front of the seat frame.

The cross strap 11 connects at its ends to these traces and midway its ends to the crouper-strap 5 at about the point of the hip, in any desired manner, buckles 13 and loops 15 being shown to secure the folded-over ends 15 in position, and a small latch-strap 16 being shown securing the cross-strap 11 to the crouper-strap 5.

I prefer to so position the points of attachment of the traces and the saddle and so fix the length of the cross-strap that the points of attachment of the cross-strap and the traces are at about the height but forward of the hip joints of the horse, while the forward ends of the traces are nearly horizontal. The shortness of the traces between the points of connection with the cross-strap and the fact that these portions of the traces lie around its thighs cause the horse to run central of the sulky and its thills. When thus held along the central line of the vehicle it becomes almost impossible for the horse to kick the wheels and the danger of kicking off a tire is negligible. It also becomes almost impossible for a horse to crowd over sidewise when scoring for a race and therefore the resultant damage is avoided.

The details of construction and the proportions of the parts may all be changed by those skilled in the art without departing from the spirit of my invention as set forth in the following claims.

I claim:—

1. In a harness for hitching horses to light wagons, comprising a saddle and a pair of traces attached thereto and having their rear ends joined and adapted to be secured to a transverse member of the vehicle, and a cross-strap extending across the back of the animal at about the point of the hip and attached at its ends to the traces at about he height of the hip joint.

2. In a harness for hitching horses to light wagons, comprising a saddle and a pair of traces attached thereto and having their rear ends joined and adapted to be secured to a transverse member of the vehicle, and a cross-strap extending across the back of the animal at about the point of the hip and attaching at its ends to the traces at about the height of the hip joint, the portions of the traces forward of such points of attachment of the cross-strap being substantially horizontal.

3. In a harness for hitching horses to light wagons, comprising a saddle and a pair of traces attached thereto and having their rear ends joined and adapted to be secured to a transverse member of the vehicle, and a cross-strap extending across the back of the animal at about the point of the hip and attaching at its ends to the traces at about the height of the hip joint, the portions of the traces forward of such points of attachment of the cross-strap being substantially horizontal and the portions in the rear of said points of attachment lying against and around the thighs of the animal.

LEWIS HOMER BOYLE.